(12) United States Patent
Hacker

(10) Patent No.: US 7,017,295 B2
(45) Date of Patent: Mar. 28, 2006

(54) DEVICE FOR HANDLING FISH

(76) Inventor: Clarence Hacker, 9695 Rocky Ridge, Tomahawk, WI (US) 54487

( * ) Notice: Subject to any disclaimer, the term of this patent is extended or adjusted under 35 U.S.C. 154(b) by 24 days.

(21) Appl. No.: 10/914,560

(22) Filed: Aug. 9, 2004

(65) Prior Publication Data

US 2006/0026889 A1    Feb. 9, 2006

(51) Int. Cl.
*A01K 97/14* (2006.01)
(52) U.S. Cl. .......................................................... 43/5
(58) Field of Classification Search .................. 43/5, 43/4, 53.5; 294/26; D22/149
See application file for complete search history.

(56) References Cited

U.S. PATENT DOCUMENTS

| | | |
|---|---|---|
| D217,429 S | 5/1970 | Parsons |
| D223,699 S | 5/1972 | Kamins et al. |
| 3,923,191 A | 12/1975 | Johnson |
| D250,746 S | 1/1979 | Powell |
| 4,497,457 A | 2/1985 | Harvey |
| D284,810 S | 7/1986 | Kelemen, Sr. |
| 4,688,739 A | 8/1987 | Moore |
| D294,915 S | 3/1988 | Alonso |
| 4,779,815 A | 10/1988 | Moore et al. |
| D306,394 S * | 3/1990 | Koenig ........................ D8/102 |
| D329,584 S | 9/1992 | Shevin et al. |
| 5,181,757 A * | 1/1993 | Montoya ..................... 294/159 |
| D333,773 S | 3/1993 | Schapiro |
| 5,197,176 A * | 3/1993 | Reese .......................... 29/278 |
| D336,732 S | 6/1993 | Joyner |
| 5,339,555 A * | 8/1994 | Miskimins ..................... 43/5 |
| D358,094 S | 5/1995 | DeGiacomo |
| D359,235 S | 6/1995 | Kennedy et al. |
| D361,263 S | 8/1995 | Carmo et al. |
| D362,386 S | 9/1995 | Blocker |
| D362,622 S | 9/1995 | Van Davelaar |
| 5,507,544 A | 4/1996 | McQuade et al. |
| D369,470 S | 5/1996 | Suggs, Sr. |
| D374,620 S | 10/1996 | McQuade et al. |
| D380,670 S | 7/1997 | Blocker |
| D400,785 S | 11/1998 | Randall |
| D417,393 S | 12/1999 | DiMeo et al. |
| 6,003,803 A | 12/1999 | Knapp et al. |
| D422,867 S | 4/2000 | Forbes |
| D423,348 S | 4/2000 | Le Roux |
| D427,891 S | 7/2000 | Senior |
| D435,083 S * | 12/2000 | Miller ........................ D22/149 |
| D441,653 S | 5/2001 | Le Roux |
| D448,665 S | 10/2001 | Lenczowski |

(Continued)

*Primary Examiner*—Kurt Rowan
(74) *Attorney, Agent, or Firm*—Howard & Howard

(57) ABSTRACT

The device includes a handle portion (10) and a spaced hook portion (11) to present a fish retention pocket (12). The hook portion (11) and the handle portion (10) present straight sides (16, 17) diverging from the pocket bottom (14) to provide a wider open space (S) between the handle portion (10) and hook portion (11) at a distal end (15) of the hook portion (11) than the closed space (WB) at the bottom (14) of the pocket (12). The hook portion (11) extends along a hook axis (A) from an arm portion (13) to the distal end (15) and tapers inwardly. The straight side (16) of the handle portion (10) is parallel to the hook axis (A). The hook portion (11) has the cross section of an I beam with parallel upper and lower transverse flanges (18) centrally interconnected by a center web (19) with the flanges (18) and the center web (19) tapering inwardly toward the distal end (15).

23 Claims, 3 Drawing Sheets

U.S. PATENT DOCUMENTS

| | | |
|---|---|---|
| 6,382,549 B1 | 5/2002 | Krake |
| D463,279 S | 9/2002 | Piazza |
| 6,447,033 B1 * | 9/2002 | Konczak .................... 294/15 |
| D466,014 S | 11/2002 | Le Roux |
| D469,015 S * | 1/2003 | LeRoux ...................... D9/455 |
| 6,511,114 B1 | 1/2003 | Fludd |

* cited by examiner

DEVICE FOR HANDLING FISH

BACKGROUND OF THE INVENTION

1. Field of the Invention

The subject invention relates to a device for handling fish.

2. Description of the Prior Art

The prior art is replete with devices for carrying or toting articles. Examples of such are shown in U.S. Pat. Nos. D441,653; D469,015 and 5,181,757 for carrying bags. All of these devices include a handle portion for gripping by a human hand and a hook portion spaced from the handle portion to present a pocket. However, the pocket formed between the hook portion and the hand portion is formed to retain the straps of a bag and is relatively large to pass through the loop of the bag strap.

Similar looking devices are known in the art for carrying cords, U.S. Pat. No. 6,003,803, and for opening envelopes, U.S. Design Pat. No. D306,394. However, these devices could not be used to carry fish or the like.

SUMMARY OF THE INVENTION AND ADVANTAGES

The subject invention provides a device for handling fish that includes a handle portion and a hook portion. The handle portion extends between a closed end and an open end for gripping by a human hand, and the hook portion is spaced from to the handle portion to present a fish retention pocket therebetween. The device also includes an arm portion interconnecting the handle portion and the hook portion at the closed end to define a bottom of the pocket, with the hook portion extending from the arm portion to a distal end. The hook portion and the handle portion present straight sides diverging from the bottom to the open end and of the pocket to provide a wider open space between the handle portion and hook portion at the distal end of the hook portion than the closed space between the handle portion and hook portion defined by the arm portion at the bottom of the pocket.

Because of the straight sides defining the fish pocket, the fish can be hooked and supported without damage to the fish while allowing easy removal of the fish from the device.

BRIEF DESCRIPTION OF THE DRAWINGS

Other advantages of the present invention will be readily appreciated, as the sane becomes better understood by reference to the following detailed description when considered in connection with the accompanying drawings wherein.

DETAILED DESCRIPTION OF THE PREFERRED EMBODIMENT

Referring to the Figures, wherein like numerals indicate corresponding parts throughout the several views, a device for handling fish is generally shown in FIGS. 1–3 and 4.

The device includes a handle portion, generally indicated at 10, extending between a closed end and an open end for gripping by a human hand. As the device is oriented in FIG. 1, the closed end is generally toward the bottom of the device and the open end is generally toward the top of the device. A hook portion, generally indicated at 11, is spaced from the handle portion 10 to present a fish retention pocket, generally indicated at 12, with the handle portion 10. An arm portion, generally indicated at 13, interconnects the handle portion 10 and hook portion 11 at the closed end to define a bottom 14 of the pocket 12.

Figure 1:
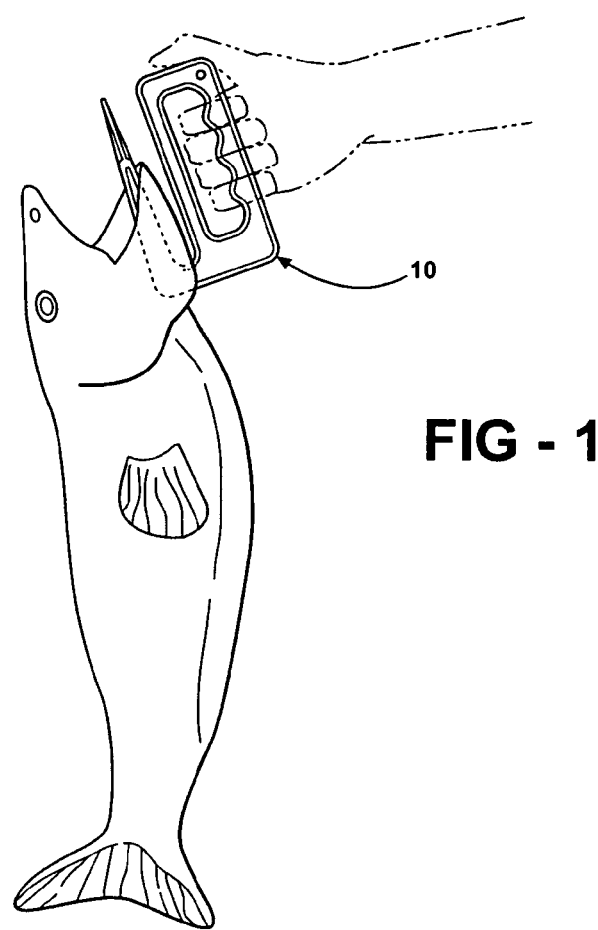
FIG. 1 is an environmental view illustrating the use of the invention.
Figure 2:
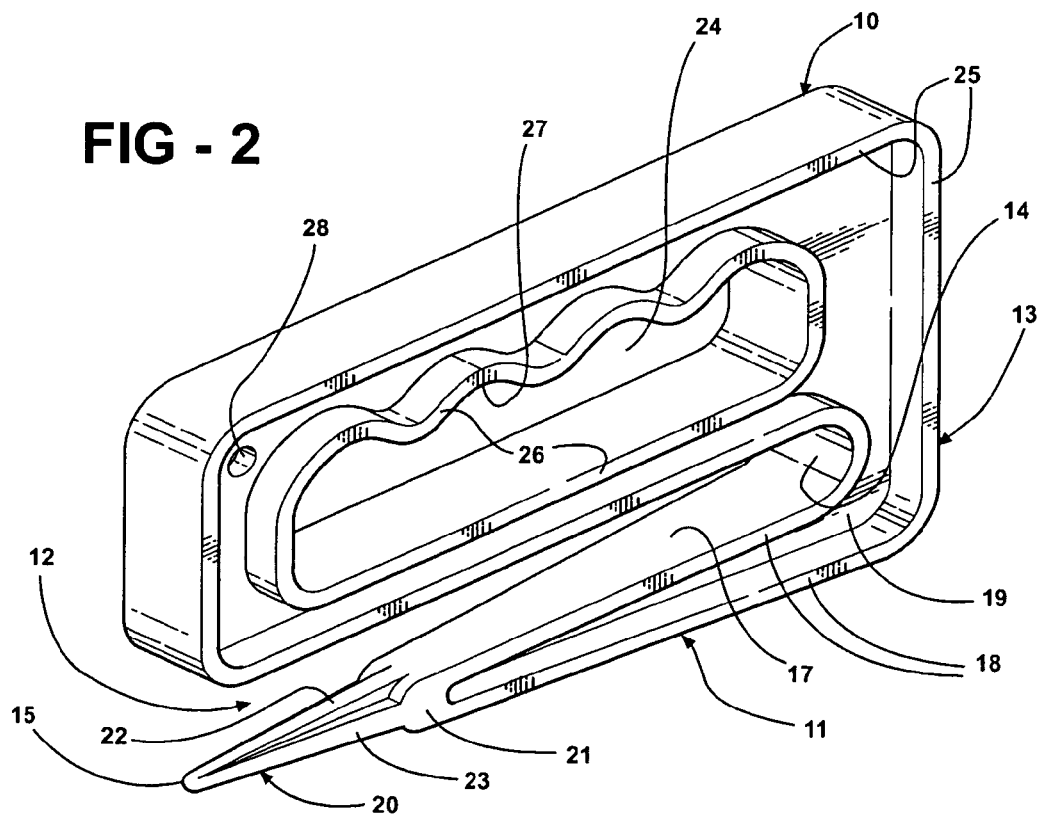
FIG. 2 is a perspective view of the invention.
Figure 3:
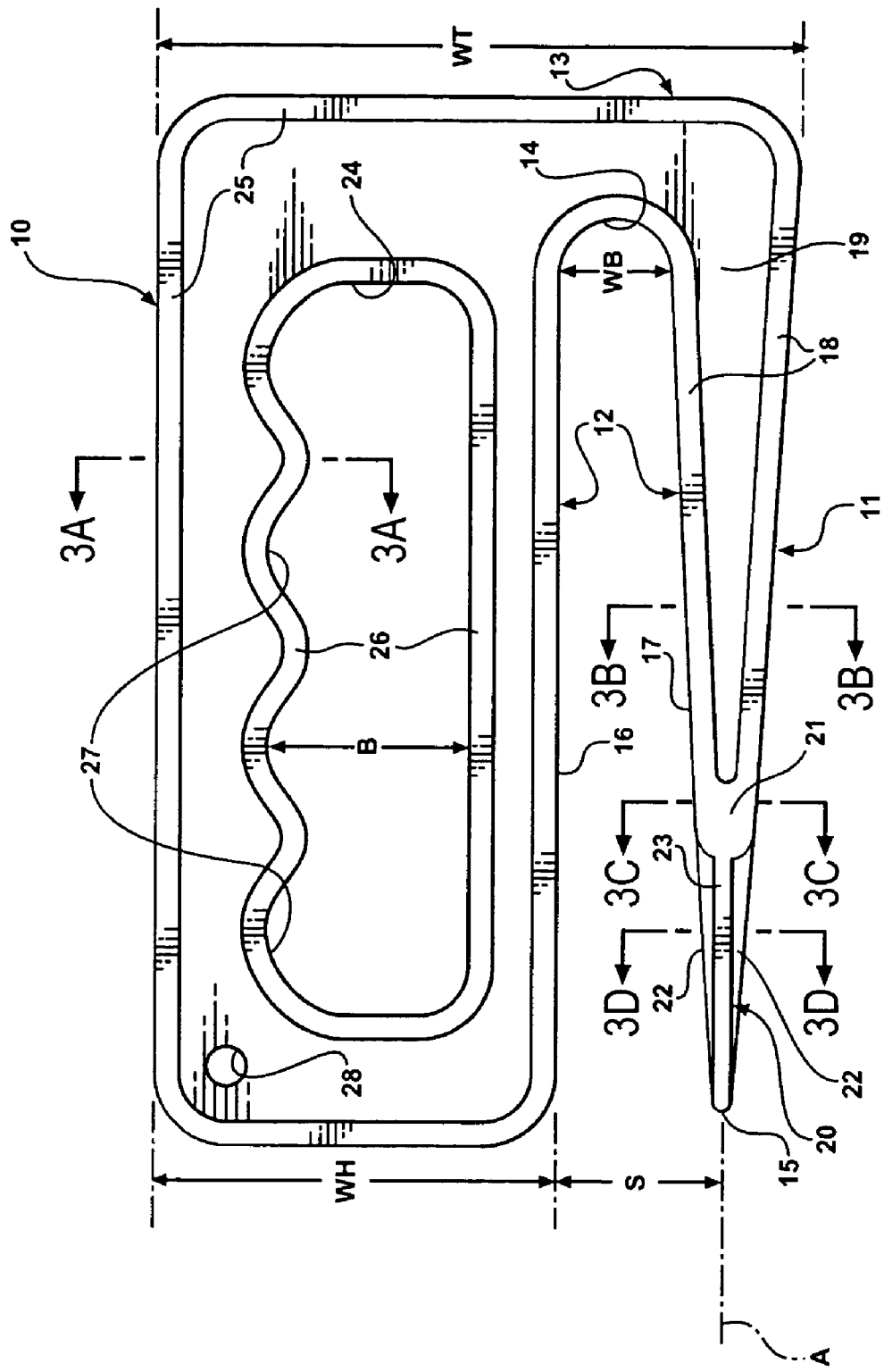
FIG. 3 is a side elevational view of the invention.

The hook portion 11 extends from the arm portion 13 to a distal end 15. As shown in FIG. 3, the hook portion 11 and the handle portion 10 present straight sides 16, 17, i.e., a straight handle side 16 and a straight hook side 17, diverging from the pocket bottom 14 to an open end of the pocket 12 to provide a wider open space S between the handle portion 10 and hook portion 11 at the distal end 15 of the hook portion 11 than the closed space WB between the handle portion 10 and hook portion 11 defined by the arm portion 13 at the bottom 14 of the pocket 12. It is important that the pocket 12 have straight sides 16, 17 so the fish is easily removed from the hook portion 11. It is also important that the hook portion 11 be free of any protrusions, such as cutting elements, that would damage the fish.

Figure 3A:
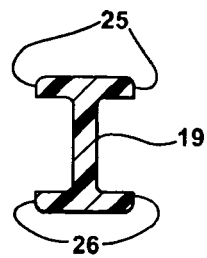
FIGS. 3A through 3D are cross sectional views taken along respective lines 3A through 3D.
Figure 3B:
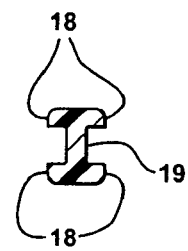
Figure 3C:
Figure 3D:
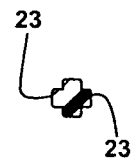
Figure 4:
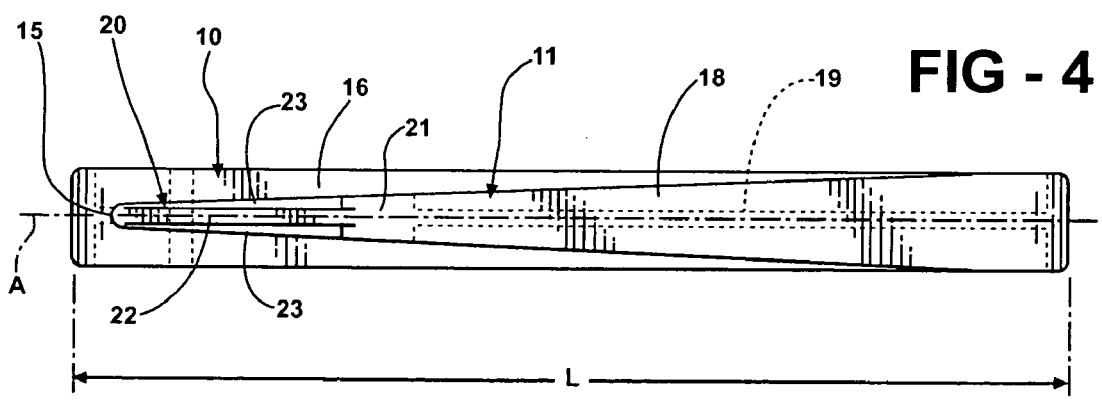
FIG. 4 is a bottom view of FIG. 3.

The hook portion 11 extends along a hook axis A from the arm portion 13 to the distal end 15 and tapers inwardly in transverse radial directions toward the axis A from the arm portion 13 to the distal end 15. The straight side 16 of the handle portion 10 is parallel to the hook axis A. As shown in FIG. 3B, the hook portion 11 has the cross section of an I beam with parallel upper and lower transverse flanges 18 having edges and centrally interconnected by a center web 19. The flanges 18 and the center web 19 taper inwardly from the arm portion 13 toward the distal end 15 whereby the I beam cross section reduces in size radially inwardly and progressively along the taper.

The hook portion 11 is preferably pointed in the sense that the hook portion 11 extends to a round bullet shaped tip section, generally indicated at 20, at the distal end 15. The tip section 20 includes a four sided solid cross sectional solid section 21 between the flanges 18 and the tip section 20. The tip section 20 includes top and bottom ribs 22 extending from the solid four sided section in alignment with the flanges 18 to the distal end 15. In other words, the outer surfaces of the flanges 18 are in the same converging planes as the outer surfaces of the top and bottom ribs 22. The tip section 20 also includes side ribs 23 extending from the solid four sided section 21 and in alignment with the tapering edges of the flanges 18 to the distal end 15. In a similar fashion, the outer surfaces of the edges of the flanges 18 are in the same converging planes as the outer surfaces of the side ribs 23.

The handle portion 10 includes an elongated hand opening 24 and the center web 19 extends through the arm portion 13 and about the hand opening 24 in the handle portion 10. An outer periphery flange 25 defined by one of the flanges 18 of the hook portion 11 that extends about the periphery of the center web 19 through the arm portion 13 and about the handle portion 10 to define the straight side 16 of the handle portion 10 and through the bottom 14 of the pocket 12 and into the other of the flanges 18 to define the straight side 17 of the hook portion 11.

The elongated hand opening 24 extends parallel to the hook axis A and has a transverse width. A hand flange 26 extends transversely to and is connected to the center web 19 about the hand opening 24 thereby presenting an I beam cross section between the hand flange 26 and the outer periphery flange 25, as shown in FIG. 3A. The hand flange 26 of the hand portion 10 includes finger undulations 27 in the hand opening 24 for receiving fingers of a human hand.

The handle portion 10 also includes a hanger 28 for hanging the device on a support and in the preferred embodiment the hanger 28 comprises a hole.

The device is large and sturdy, i.e., rigid, enough to support a rather large fish. The handle 10 portion has a handle width WH and a handle length L and the hook portion 11 extends nearly the entire handle length L of the handle portion 10, the hook portion 11 extending over ninety percent of the entire handle length L. The transverse width of the hand opening 24 at the maximum distance B is within twenty percent of the maximum opening distance S between the straight side 16 of the handle portion 10 and the hook axis A. More specifically, the maximum distance B of the transverse width of the hand opening 24 is greater than the maximum opening distance S.

The device has a total width WT across the hand portion 10 and the arm portion 13 that is approximately one hundred and fifteen percent of the hand portion width WH and the handle length L of the hand portion 10 is approximately one hundred and sixty five percent of the total width WT. Furthermore, the maximum opening distance S between the straight side 16 of the handle portion 10 and the hook axis A is approximately forty two percent of the handle width WH. The bottom 14 of the pocket 12 is disposed on a radius to define a semicircular pocket bottom 14 having a bottom diameter or width WB. The pocket bottom width WB is approximately seventy five percent of the maximum opening distance S between the straight side 16 of the handle portion 10 and the hook axis A.

In the preferred embodiment of the invention, the handle portion 10 has a handle width WH of 2⅜ inches and a handle length L of 6⅜ inches and the hook portion 11 extends over ninety percent of the entire handle length L. The transverse width of the hand opening 24 at the maximum distance B is greater than the maximum opening distance S of 1 inch, between the straight side 16 of the handle portion 10 and the hook axis A. The device has a total width WT of 3⅞ inches across the hand portion 10. The bottom 14 of the pocket 12 is disposed on a ⅜ inch radius to define a semicircular pocket bottom 14 having a 0.75 inch bottom diameter or width WB.

Obviously many modifications and variations of the present invention are possible in light of the above teachings. It is, therefore, to be understood that within the scope of the appended claims, the invention may be practiced otherwise than as specifically described.

What is claimed is:

1. A device for handling fish comprising:
   a handle portion (10) extending between a closed end and an open end for gripping by a human hand,
   a hook portion (11) spaced from said handle portion (10) to present a fish retention pocket (12) therebetween,
   an arm portion (13) interconnecting said handle portion (10) and hook portion (11) at said closed end to define a bottom (14) of said pocket (12),
   said hook portion (11) extending along a hook axis (A) from said arm portion (13) to a distal end (15),
   said hook portion (11) and said handle portion (10) presenting straight sides (16, 17) diverging from said bottom (14) to an open end of said pocket (12) with said straight side (16) of said handle portion (10) parallel to said hook axis (A) to provide a wider open space (S) between said handle portion (10) and hook portion (11) at said distal end (15) of said hook portion (11) than the closed space (WB) between said handle portion (10) and hook portion (11) defined by said arm portion (13) at said bottom (14) of said pocket (12),
   said hook portion (11) has a cross section that tapers inwardly in transverse radial directions toward said axis (A) from said arm portion (13) to said distal end (15) so that said cross section of said hook portion (11) progressively reduces in size from said arm portion (13) to said distal end (15),
   said cross section of said hook portion (11) is of an I beam with parallel traverse flanges (18) having edges and centrally interconnected by a center web (19), said flanges and said center web (19) tapering inwardly from said arm portion (13) toward said distal end (15) whereby said I beam cross section reduces in size along said taper,
   said hook portion (11) includes a round, bullet-shaped tip section (20) at said distal end (15), and
   said hook portion (11) includes a four sided solid cross sectional section (21) between said flanges (18) and said tip section (20).

2. A device as set forth in claim 1 wherein said tip section (20) includes top and bottom ribs (22) extending from said solid four sided section (21) in alignment with said flanges (18) to said distal end (15).

3. A device as set forth in claim 2 wherein said tip section (20) includes side ribs (23) extending from said solid four sided section (21) in alignment with said tapering edges of said flanges (18) to said distal end (15).

4. A device as set forth in claim 3 wherein said handle portion (10) includes a hand opening (24) and said center web (19) extends through said arm portion (13) and about said hand opening (24) in said handle portion (10).

5. A device as set forth in claim 4 including an outer periphery flange (25) defined by one of said flanges (18) of said hook portion (11) extending about the periphery of said center web (19) through said arm portion (13) and about said handle portion (10) to define said straight side (16) of said handle portion (10) and through said bottom (14) of said pocket (12) and into the other of said flanges (18) to define said straight side (17) of said hook portion (11).

6. A device as set forth in claim 5 wherein said handle portion (10) presents an elongated band opening (24) extending parallel to said hook axis (A) and having a transverse width.

7. A device as set forth in claim 5 including a hand flange (26) extending transversely to and connected to said center web (19) about said hand opening (24) thereby presenting an I beam cross section between said hand flange (26) and said outer periphery flange (25).

8. A device as set forth in claim 7 wherein said transverse width of said hand opening (24) at the maximum distance (B) is within twenty percent of the maximum opening distance (S) between said straight side (16) of said handle portion (10) and said hook axis (A).

9. A device as set forth in claim 8 wherein said maximum distance (B) of said transverse width of said hand opening (24) is greater than said maximum opening distance (S).

10. A device as set forth in claim 9 wherein said handle portion (10) includes a hanger (28) for hanging said device on a support.

11. A device as set forth in claim 10 wherein said hanger (28) comprises a hole.

12. A device as set forth in claim 9 wherein said handle portion (10) has a width (WH) and a length (L) and said hook portion (11) extends nearly the entire handle length (L) of said hand portion (10).

13. A device as set forth in claim 12 wherein said hand portion (10) includes finger undulations (27) in said hand opening (24) for receiving fingers of a human hand.

14. A device as set forth in claim 12 wherein said device has a total width (WT) across said hand portion (10) and said arm portion (13) that is approximately one hundred and fifteen percent of said hand portion width (WH).

15. A device as set forth in claim 14 wherein said handle length (L) of said hand portion (10) is approximately one hundred and sixty five percent of said total width (WT).

16. A device as set forth in claim 15 wherein said maximum opening distance (S) between said straight side (16) of said handle portion (10) and said hook axis (A) is approximately forty two percent of said handle width (WH).

17. A device as set forth in claim 16 wherein said bottom (14) of said pocket (12) is disposed on a radius to define a semicircular pocket to define a bottom width (WB).

18. A device as set forth in claim 17 wherein said pocket bottom width (WB) is approximately seventy five percent of said maximum opening distance (S) between said straight side (16) of said handle portion (10) and said hook axis (A).

19. A device as set forth in claim 1 wherein said handle portion (10) presents an elongated hand opening (24) extending parallel to said hook axis (A).

20. A device as set forth in claim 19 wherein said transverse width of said hand opening (24) at the maximum distance (B) is within twenty percent of the maximum opening distance (S) between said straight side (16) of said handle portion (10) and said hook axis (A).

21. A device as set forth in claim 20 wherein said maximum distance (B) of said transverse width of said hand opening (24) is greater than said maximum opening distance (S).

22. A device as set forth in claim 1 wherein said handle portion (10) includes a handler (28) for hanging said device on a support.

23. A device as set forth in claim 22 wherein said hanger (28) comprises a hole.

* * * * *

UNITED STATES PATENT AND TRADEMARK OFFICE
CERTIFICATE OF CORRECTION

PATENT NO. : 7,017,295 B2  Page 1 of 1
DATED : March 28, 2006
INVENTOR(S) : Clarence Hacker It is certified that error appears in the above-identified patent and that said Letters Patent is hereby corrected as shown below:

Column 4,
Line 10, after "parallel" delete "traverse" and insert -- transverse --.
Line 43, after "elongated" delete "band" and insert -- hand --.

Signed and Sealed this

Thirtieth Day of May, 2006

JON W. DUDAS
*Director of the United States Patent and Trademark Office*